US012361849B2

(12) United States Patent
Meng

(10) Patent No.: US 12,361,849 B2
(45) Date of Patent: Jul. 15, 2025

(54) PIXEL DRIVING CIRCUIT AND CONTROL METHOD THEREOF

(71) Applicant: SHENZHEN CHINA STAR OPTOELECTRONICS SEMICONDUCTOR DISPLAY TECHNOLOGY CO., LTD., Guangdong (CN)

(72) Inventor: Defang Meng, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/758,066

(22) PCT Filed: May 18, 2022

(86) PCT No.: PCT/CN2022/093542
§ 371 (c)(1),
(2) Date: Jun. 27, 2022

(87) PCT Pub. No.: WO2023/206648
PCT Pub. Date: Nov. 2, 2023

(65) Prior Publication Data

US 2024/0177638 A1 May 30, 2024

(30) Foreign Application Priority Data

Apr. 25, 2022 (CN) ......................... 202210440226.8

(51) Int. Cl.
*G09G 3/00* (2006.01)
*G09G 3/3233* (2016.01)

(52) U.S. Cl.
CPC ........... *G09G 3/006* (2013.01); *G09G 3/3233* (2013.01); *G09G 2300/0819* (2013.01); *G09G 2300/0842* (2013.01); *G09G 2330/12* (2013.01)

(58) Field of Classification Search
CPC ................. G09G 3/006; G09G 3/3233; G09G 2300/0819; G09G 2300/0842; G09G 2330/12; G09G 3/3225
See application file for complete search history.

(56) References Cited

U.S. PATENT DOCUMENTS

2017/0069270 A1 3/2017 Hyeon et al.
2018/0033373 A1* 2/2018 Hong .................. G09G 3/3233
2019/0043422 A1* 2/2019 Lu ........................ G09G 3/3233

FOREIGN PATENT DOCUMENTS

CN 106486041 A 3/2017
CN 106683605 A 5/2017
(Continued)

OTHER PUBLICATIONS

International Search Report in International application No. PCT/CN2022/093542, mailed on Dec. 22, 2022.
(Continued)

*Primary Examiner* — Abhishek Sarma
(74) *Attorney, Agent, or Firm* — PV IP PC; Wei Te Chung

(57) ABSTRACT

The present disclosure discloses a pixel driving circuit and a control method thereof. The pixel driving circuit includes: a signal driving module for driving a light emitting diode to emit light based on connected scanning signal lines and data signal lines; a voltage detection module connected to the signal driving module for collecting a detection voltage of the light emitting diode and comparing the detection voltage with a reference voltage to generate a control signal; and a short circuit processing module connected to the signal
(Continued)

driving module and the voltage detection module for controlling the light emitting diode based on the control signal.

18 Claims, 6 Drawing Sheets

(56) References Cited

FOREIGN PATENT DOCUMENTS

| | | | |
|---|---|---|---|
| CN | 107665663 | A | 2/2018 |
| CN | 107799040 | A | 3/2018 |
| CN | 108682385 | A | 10/2018 |
| CN | 110580876 | A | 12/2019 |
| CN | 110689840 | A | 1/2020 |
| CN | 111128076 | A | 5/2020 |

OTHER PUBLICATIONS

Written Opinion of the International Search Authority in International application No. PCT/CN2022/093542, mailed on Dec. 22, 2022.

Chinese Office Action issued in corresponding Chinese Patent Application No. 202210440226.8 dated Nov. 28, 2022, pp. 1-10.

* cited by examiner

PIXEL DRIVING CIRCUIT AND CONTROL METHOD THEREOF

TECHNICAL FIELD

The present disclosure relates to a display technology field, and more particularly to a pixel driving circuit and a control method thereof.

BACKGROUND

In recent years, increasing development and progress of display technologies such as a Liquid Crystal Display (LCD) and an Active Matrix Organic Light Emitting Diode (AMOLED) display may bring increasingly display products. Self-emitting displays (AMOLED and Mini-LED displays) are becoming the next generation of new display technologies due to their fast response speeds, good viewing angle characteristics, and excellent color gamut performance. However, an OLED display may be short circuited due to a production process of the self-emitting display, which affects a display effect and even damages the entire panel.

Currently, in an existing solution, the OLED may be detected by means of sampling, but cannot be processed, and a panel loss caused by a short circuit cannot be avoided.

Technical Problems

In the case that the OLED display may be short circuited due to a production process of the self-emitting display, in the existing solution, the OLED may be detected by means of sampling, but cannot be processed, and the panel loss caused by the short circuit cannot be avoided.

Technical Solutions to the Problems

Embodiments of the present disclosure provide a display panel, a manufacturing method thereof, and a display device. The short circuit processing module avoids that a panel is damaged due to an excessive current caused by the short circuit by driving a light emitting diode of a signal driving module to be turned off or on based on a control signal.

In a first aspect, an embodiment of the present disclosure provides a pixel driving circuit, including:

a signal driving module connected to scanning signal lines and data signal lines for driving a light emitting diode of the signal driving module to emit light based on the scanning signal lines and the data signal lines;

a voltage detection module electrically connected to the signal driving module for collecting a detection voltage of the light emitting diode of the signal driving module and comparing the detection voltage with a reference voltage to generate a control signal; and a short circuit processing module electrically connected to the signal driving module and the voltage detection module for controlling the light emitting diode of the signal driving module to be turned off or on based on the control signal;

wherein, the scanning signal lines include a first scanning signal line and a second scanning signal line, and the signal driving module includes:

a first switching transistor, wherein a gate of the first switching transistor is electrically connected to the first scanning signal line, one of a source and a drain of the first switching transistor is electrically connected to the data signal line, and another of the source and the drain of the first switching transistor is electrically connected to a first node;

a driving transistor, wherein a gate of the driving transistor is electrically connected to the first node, one of a source and a drain of the driving transistor is electrically connected to a second node, and another of the source and the drain of the driving transistor is electrically connected to a power signal terminal;

a storage capacitor, wherein one terminal of the storage capacitor is electrically connected to the first node, and another terminal of the storage capacitor is electrically connected to the second node;

a light emitting diode, wherein an anode of the light emitting diode is electrically connected to the second node, and a cathode of the light emitting diode is electrically connected to a ground terminal; and a second switching transistor, wherein a gate of the second switching transistor is electrically connected to the second scanning signal line, one of a source and a drain of the second switching transistor is electrically connected to the second node, and another of the source and the drain of the second switching transistor is electrically connected to the voltage detection module;

wherein the short circuit processing module is connected in series between any adjacent two of the power signal terminal, the driving transistor, the light emitting diode, and the ground terminal;

wherein, the voltage detection module includes:

a controller electrically connected to the short circuit processing module for detecting the detection voltage of the light emitting diode of the signal driving module and comparing the detection voltage with the reference voltage to generate the control signal;

a reference switch, wherein one terminal of the reference switch is electrically connected to a third node, another terminal of the reference switch is electrically connected to the controller and a reference voltage terminal, and another of the source and the drain of the second switching transistor is electrically connected to the third node; and a sampling switch, wherein one terminal of the sampling switch is electrically connected to the third node, and another terminal of the sampling switch is electrically connected to the controller.

In some embodiments, the controller includes:

an analog-to-digital converter electrically connected to the sampling switch for collecting a detection voltage of the third node when the sampling switch is closed; and a comparator electrically connected to the reference voltage terminal, the analog-to-digital converter, and the short circuit processing module for comparing the detection voltage with the reference voltage to generate the control signal.

In some embodiments, the short circuit processing module includes a third switching transistor, wherein a gate of the third switching transistor is electrically connected to the controller, one of a source and a drain of the third switching transistor is close to the ground terminal, another of the source and the drain of the third switching transistor is close to the power signal terminal, and the third switching transistor is configured to be turned off or on based on the control signal.

In some embodiments, the one of the source and the drain of the third switching transistor is electrically connected to the another of the source and the drain of the driving transistor, and the another of the source and the drain of the third switching transistor is electrically connected to the power signal terminal; or the one of the source and the drain of the third switching transistor is electrically connected to the light emitting diode, and the another of the source and the drain of the third switching transistor is electrically connected to the one of the source and the drain of the driving transistor; or the one of the source and the drain of the third switching transistor is electrically connected to the ground terminal, and the another of the source and the drain of the third switching transistor is electrically connected to the light emitting diode.

In some embodiments, driving timing of the pixel driving circuit includes:

an initialization phase state1, in which the reference switch is closed and the reference voltage is input to the third node;

a detection phase state2, in which the reference switch is opened, and the second scanning signal line is at a high potential so that the second switching transistor is turned on and the third node is connected to the second node; and a sampling phase state3, in which the sampling switch is closed and the controller collects the detection voltage of the third node and compares the detection voltage with the reference voltage to generate the control signal.

In a first aspect, an embodiment of the present disclosure provides a pixel driving circuit, including:

a signal driving module connected to scanning signal lines and data signal lines for driving a light emitting diode of the signal driving module to emit light based on the scanning signal lines and the data signal lines;

a voltage detection module electrically connected to the signal driving module for collecting a detection voltage of the light emitting diode of the signal driving module and comparing the detection voltage with a reference voltage to generate a control signal; and a short circuit processing module electrically connected to the signal driving module and the voltage detection module for controlling the light emitting diode of the signal driving module to be turned off or on based on the control signal.

In some embodiments, the signal driving circuit includes at least three transistors.

In some embodiments, the scanning signal lines includes a first scanning signal line and a second scanning signal line, and the signal driving module includes:

a first switching transistor, wherein a gate of the first switching transistor is electrically connected to the first scanning signal line, one of a source and a drain of the first switching transistor is electrically connected to the data signal line, and another of the source and the drain of the first switching transistor is electrically connected to a first node;

a driving transistor, wherein a gate of the driving transistor is electrically connected to the first node, one of a source and a drain of the driving transistor is electrically connected to a second node, and another of the source and the drain of the driving transistor is electrically connected to a power signal terminal;

a storage capacitor, wherein one terminal of the storage capacitor is electrically connected to the first node, and another terminal of the storage capacitor is electrically connected to the second node;

a light emitting diode, wherein an anode of the light emitting diode is electrically connected to the second node, and a cathode of the light emitting diode is electrically connected to a ground terminal; and a second switching transistor, wherein a gate of the second switching transistor is electrically connected to the second scanning signal line, one of a source and a drain of the second switching transistor is electrically connected to the second node, and another of the source and the drain of the second switching transistor is electrically connected to the voltage detection module;

wherein the short circuit processing module is connected in series between any adjacent two of the power signal terminal, the driving transistor, the light emitting diode, and the ground terminal.

In some embodiments, the voltage detection module includes:

a controller electrically connected to the short circuit processing module for detecting the detection voltage of the light emitting diode of the signal driving module and comparing the detection voltage with the reference voltage to generate the control signal;

a reference switch, wherein one terminal of the reference switch is electrically connected to a third node, another terminal of the reference switch is electrically connected to the controller and a reference voltage terminal, and another of the source and the drain of the second switching transistor is electrically connected to the third node; and a sampling switch, wherein one terminal of the sampling switch is electrically connected to the third node, and another terminal of the sampling switch is electrically connected to the controller.

In some embodiments, the controller includes:

an analog-to-digital converter electrically connected to the sampling switch for collecting a detection voltage of the third node when the sampling switch is closed; and a comparator electrically connected to the reference voltage terminal, the analog-to-digital converter, and the short circuit processing module for comparing the detection voltage with the reference voltage to generate the control signal.

In some embodiments, the voltage detection module further includes a linear capacitor through which the third node is grounded.

In some embodiments, the short circuit processing module includes a third switching transistor, wherein a gate of the third switching transistor is electrically connected to the controller, one of a source and a drain of the third switching transistor is close to the ground terminal, another of the source and the drain of the third switching transistor is close to the power signal terminal, and the third switching transistor is configured to be turned off or on based on the control signal.

In some embodiments, the short circuit processing module includes at least two third switching transistors connected in parallel or in series, wherein a gate of the at least two third switching transistors is electrically connected to the controller, one of a source and a drain of the at least two third switching transistors is close to the ground terminal, and another of the source and the drain of the at least two third switching transistors is close to the power signal terminal.

In some embodiments, the one of the source and the drain of the third switching transistor is electrically connected to the another of the source and the drain of the driving transistor, and the another of the source and the drain of the third switching transistor is electrically connected to the power signal terminal; or the one of the source and the drain of the third switching transistor is electrically connected to the light emitting diode, and the another of the source and the drain of the third switching transistor is electrically connected to the one of the source and the drain of the driving transistor; or the one of the source and the drain of the third switching transistor is electrically connected to the ground terminal, and the another of the source and the drain of the third switching transistor is electrically connected to the light emitting diode.

In some embodiments, driving timing of the pixel driving circuit includes:

an initialization phase state1, in which the reference switch is closed and the reference voltage is input to the third node;

a detection phase state2, in which the reference switch is opened, and the second scanning signal line is at a high potential so that the second switching transistor is turned on and the third node is connected to the second node; and a sampling phase state3, in which the sampling switch is closed and the controller collects the detection voltage of the third node and compares the detection voltage with the reference voltage to generate the control signal.

In some embodiments, each of the initialization stage state1, the detection stage state2, and the sampling stage state3 holds a preset duration corresponding to the stage.

In some embodiment, the short circuit processing module includes a NOT gate disposed between the controller and the gate of the third switching transistor.

In some embodiments, the short circuit processing module controls the light emitting diode to be turned on when the control signal shows that the detection voltage is the same as a preset reference voltage; and the short circuit processing module controls the light emitting diode to be turned off when the control signal shows that the detection voltage is greater than a preset reference voltage.

In a second aspect, the present disclosure provides a driving method of a pixel driving circuit applied to the pixel driving circuit of any of foregoings, including:

obtaining a detection voltage of the light emitting diode of the pixel driving circuit;

comparing the detection voltage with a preset reference voltage to obtain a control signal; and controlling the light emitting diode of the pixel driving circuit to be turned on or off based on the control signal.

In some embodiments, the obtaining a detection voltage of the light emitting diode of the pixel driving circuit includes:

controlling a reference switch to be closed, and inputting the reference voltage to a third node;

controlling the reference switch to be opened after a first preset duration, and inputting a high potential to the second scanning signal line; and controlling a sampling switch to be closed after a second preset duration, and collecting the detection voltage of the third node.

In some embodiments, the controlling the light emitting diode of the pixel driving circuit to be turned on or off based on the control signal includes:

when the control signal shows that the detection voltage is the same as the preset reference voltage, determining that the light emitting diode works normally, and controlling the light emitting diode to be turned on; and when the control signal shows that the detection voltage is greater than the preset reference voltage, determining that the light emitting diode is short circuited, and controlling the light emitting diode to be turned off.

BENEFICIAL EFFECTS

According to the pixel driving circuit and the control method thereof of the embodiments of the present disclosure, the voltage detection module determines whether the light emitting diode is short circuited or not based on a comparison of the reference voltage with the detection voltage of the light emitting diode of the signal driving module, thereby generating a corresponding control signal. The short circuit processing module turns off or on the light emitting diode of the signal driving module based on the control signal. When it is detected that no short circuit occurs in the light emitting diode, the short circuit processing module does not interfere with work of the light emitting diode. When it is detected that a short circuit occurs in the light emitting diode, the light emitting diode is turned off in a timely manner, so as to avoid that a panel is damaged due to an excessive current caused by the short circuit.

BRIEF DESCRIPTION OF THE DRAWINGS

Technical solutions and other beneficial effects of the present disclosure are apparent below from detailed description of the embodiments of the present disclosure in combination with the accompanying drawings.

REFERENCE SIGNS

Figure 1:
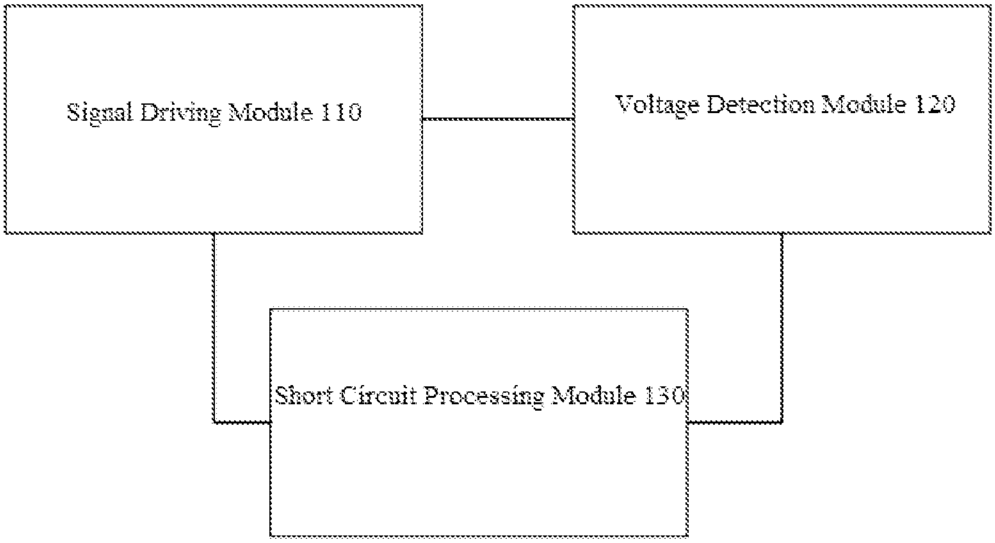
FIG. 1 is a schematic connection diagram of a pixel driving circuit according to an embodiment of the present disclosure.

110 Signal Driving Module; 120 Voltage Detection Module; and 130 Short Circuit Processing Module.

EMBODIMENTS OF THE PRESENT DISCLOSURE

Technical solutions in embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within the protection scope of the present disclosure.

In the description of the present disclosure, it should be understood that orientations or position relationships indicated by the terms "center", "longitudinal", "lateral", "length", "width", "thickness", "upper", "lower", "front", "rear", "left", "right", "vertical", "horizontal", "top", "bottom", "inside", "outside", "clockwise", and "counter-clockwise" are based on orientations or position relationships illustrated in the drawings. The terms are used to facilitate and simplify the description of the present disclosure, rather than indicate or imply that the devices or elements referred to herein are required to have specific orientations or be constructed or operate in the specific orientations. Accordingly, the terms should not be construed as limiting the present disclosure. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

In the description of the present disclosure, it should be noted that unless otherwise clearly defined and limited, the terms "mounted", "connected/coupled", and "connection" should be interpreted broadly. For example, the terms may refer to a fixed connection, a detachable connection, or an integral connection; the terms may also refer to a mechanical connection, an electrical connection, or communication with each other; the terms may further refer to a direct connection, an indirect connection through an intermediary, or an interconnection between two elements or interactive relationship between two elements. Those ordinary skilled in the art can understand the specific meanings of the above terms in the present disclosure according to specific situations.

In the present disclosure, it should be noted that unless otherwise clearly defined and limited, a first feature "on" or "under" a second feature may mean that the first feature directly contacts the second feature, or that the first feature contacts the second feature via an additional feature there between instead of directly contacting the second feature. Moreover, the first feature "on", "above", and "over" the second feature may mean that the first feature is right over or obliquely upward over the second feature or mean that the first feature has a horizontal height higher than that of the second feature. The first feature "under", "below", and "beneath" the second feature may mean that the first feature is right beneath or obliquely downward beneath the second feature or mean that horizontal height of the first feature is lower than that of the second feature.

The following description provides various embodiments or examples for implementing various structures of the present disclosure. To simplify the description of the present disclosure, parts and settings of specific examples are described as follows. Certainly, they are only illustrative, and are not intended to limit the present disclosure. Further, reference numerals and reference letters may be repeated in different examples. This repetition is for purposes of simplicity and clarity and does not indicate a relationship of the various embodiments and/or the settings. Furthermore, the present disclosure provides specific examples of various processes and materials, however, applications of other processes and/or other materials may be appreciated those skilled in the art.

Figure 2:
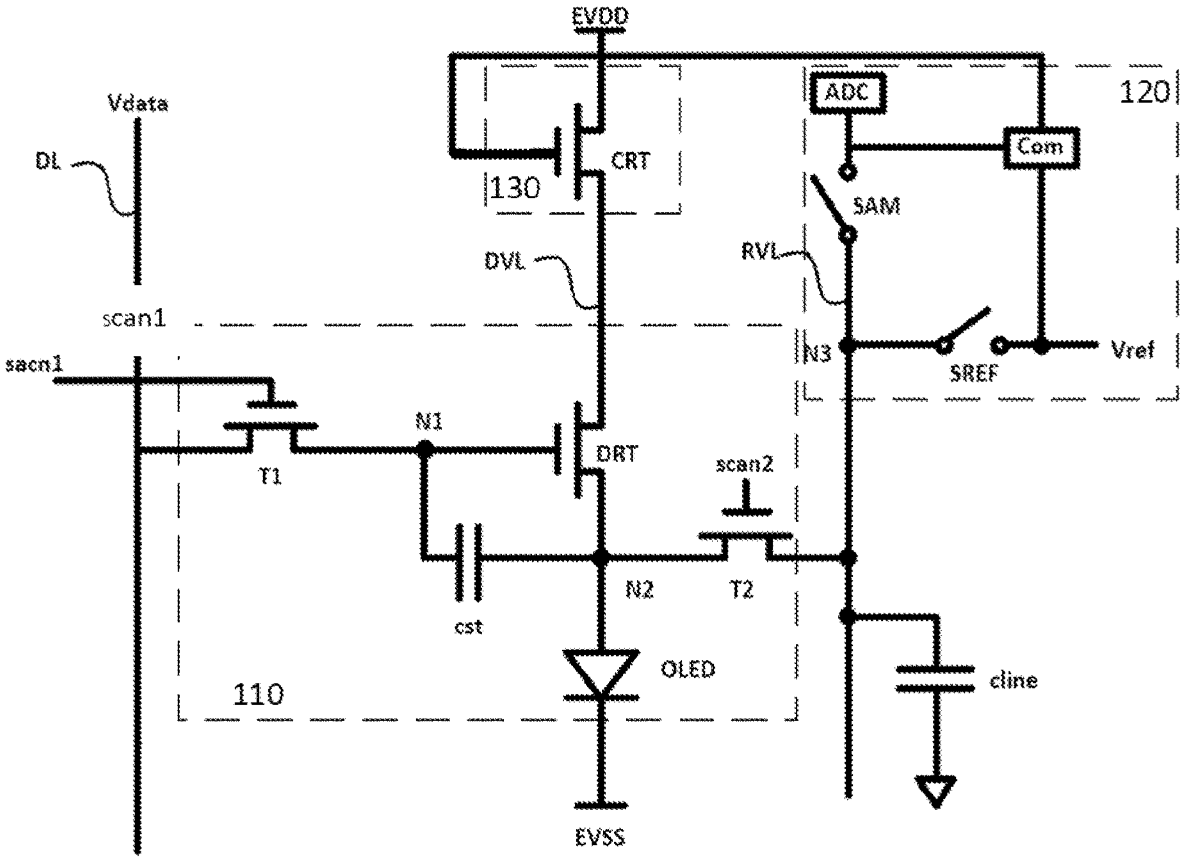
FIG. 2 is a schematic connection diagram of a pixel driving circuit according to another embodiment of the present disclosure.

Referring to FIG. 1 and FIG. 2, an embodiment of the present disclosure provides a pixel driving circuit. The pixel driving circuit includes a signal driving module 110, a voltage detection module 120, and a short circuit processing module 130. The signal driving module 110, the voltage detection module 120, and the short circuit processing module 130 are electrically connected to each other.

The signal driving module 110 includes a light emitting diode OLED. The signal driving module 110 is connected to scanning signal lines and data signal lines Vdata, and connects the data signal lines Vdata to the signal driving module 110 under the control of the scanning signal lines, so as to control the light emitting diode OLED to emit light. It should be noted that the signal driving module 110 may have circuit structures such as 3T1C, 4T1C, 5T1C, and 6T1C. This is not specifically limited in the embodiment. In addition, the 2T1C pixel structure cannot implement subsequent short circuit detection functions and short circuit processing functions. Therefore, the signal driving module 110 cannot have the 2T1C pixel structure.

The voltage detection module 120 is firstly provided with a preset reference voltage, and then collects a detection voltage when the light emitting diode OLED of the signal driving module 110 is turned on. The voltage detection module 120 compares the detection voltage with a reference voltage, and determines, according to a change of the detection voltage relative to the reference voltage, whether a short circuit occurs in the light emitting diode OLED, so as to generate a corresponding control signal. If it is detected that the short circuit occurs in the light emitting diode OLED, the light emitting diode OLED needs to be turned off. If it is detected that no short circuit occurs in the light emitting diode OLED, the work of the light emitting diode OLED is not interfered with under the control of the scanning signal lines and the data signal lines Vdata. The short circuit processing module 130 further improves a display effect by controlling the light emitting diode OLED of the signal driving module 110 to be turned off or on to avoid that a panel is damaged due to an excessive current caused by the short circuit.

In an embodiment, the 3T1C pixel structure is a simplest pixel circuit structure that can implement the short circuit detection functions and the short circuit processing functions, and another type of pixel structure also includes at least a corresponding element of the 3T1C pixel structure. Therefore, the 3T1C pixel structure is taken as an example. The scanning signal lines include a first scanning signal line scan1 and a second scanning signal line scan2. The signal driving module 110 includes a first switching transistor T1, a driving transistor DRT, a storage capacitor Cst, a light emitting diode OLED, and a second switching transistor T2.

A gate of the first switching transistor T1 is electrically connected to the first scanning signal line scan1, one of a source and a drain of the first switching transistor T1 is electrically connected to the data signal line Vdata, and another of the source and the drain of the first switching transistor T1 is electrically connected to a first node N1. When the first scanning signal line scan1 is at a high potential, the first switching transistor T1 is turned on, so that the data signal line Vdata is inputted.

A gate of the driving transistor DRT is electrically connected to the first node N1, that is, the gate of the driving transistor DRT is electrically connected to the another of the source and the drain of the first switching transistor T1, one of the source and the drain of the driving transistor DRT is electrically connected to the second node N2, and another of the source and the drain of the driving transistor DRT is electrically connected to a power signal terminal EVDD.

One terminal of the storage capacitor Cst is electrically connected to the first node N1, and another terminal of the storage capacitor Cst is electrically connected to the second node N2. That is, one terminal of the storage capacitor Cst is electrically connected to the gate of the driving transistor DRT and the another of the source and the drain of the first switching transistor T1, and the another terminal of the storage capacitor Cst is electrically connected to the one of the source and the drain of the driving transistor DRT.

An anode of the light emitting diode OLED is electrically connected to the second node N2, and a cathode of the light emitting diode OLED is electrically connected to the ground terminal EVSS. That is, the anode of the light emitting diode OLED is electrically connected to one of the source and the drain of the driving transistor DRT and another terminal of the storage capacitor Cst. In addition, the storage capacitor Cst stabilizes a voltage of the second node N2 in a pixel driving process, and the voltage of the second node N2 is consistent with a voltage of the anode of the light emitting diode OLED.

A gate of the second switching transistor T2 is electrically connected to the second scanning signal line scan2, one of the source and the drain of the second switching transistor T2 is electrically connected to the second node N2, and another of the source and the drain of the second switching transistor T2 is electrically connected to the voltage detection module 120. That is, the one of the source and the drain of the driving transistor DRT, the another terminal of the storage capacitor Cst, the anode of the light emitting diode OLED, and the one of the source and the drain of the second switching transistor T2 are electrically connected to a same point, that is, the four are interconnected.

The short circuit processing module 130 is configured to turn off or on the light emitting diode OLED of the driving module 110 based on the control signal. When it is detected that a short circuit occurs in the light emitting diode OLED, the light emitting diode OLED needs to be turned off by the short circuit processing module 130. Conversely, if it is detected that no short circuit occurs in the light emitting diode OLED, the short circuit processing module 130 does not intervene with the work of the light emitting diode OLED under the control of the scanning signal lines and the data signal lines Vdata. Therefore, the short circuit processing module 130 is disposed between the power signal terminal EVDD and the ground terminal EVSS, and is connected to the light emitting diode OLED and the driving transistor DRT. That is, the short circuit processing module 130 is connected in series between any adjacent two of the power signal terminal EVDD, the driving transistor DRT, the light emitting diode OLED, and the ground terminal EVSS.

Figure 3:
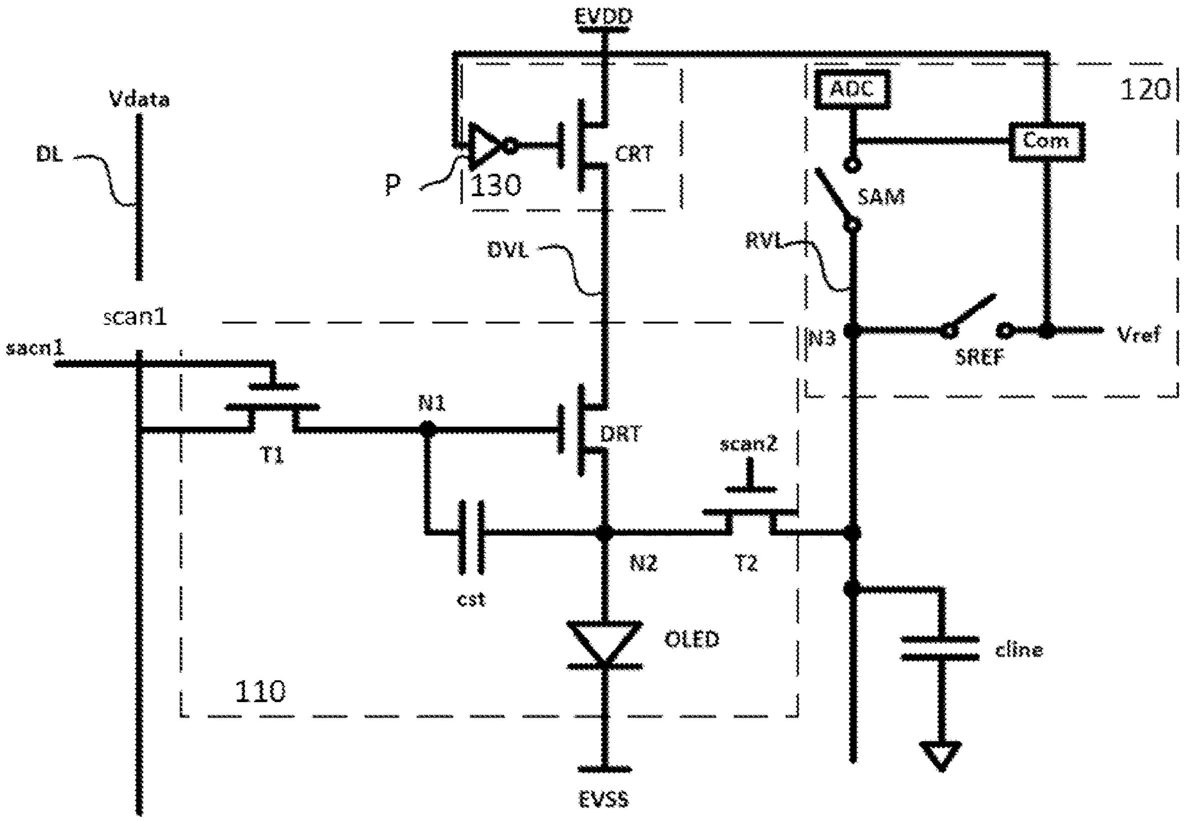
FIG. 3 is a schematic connection diagram of a pixel driving circuit according to another embodiment of the present disclosure.
Figure 4:
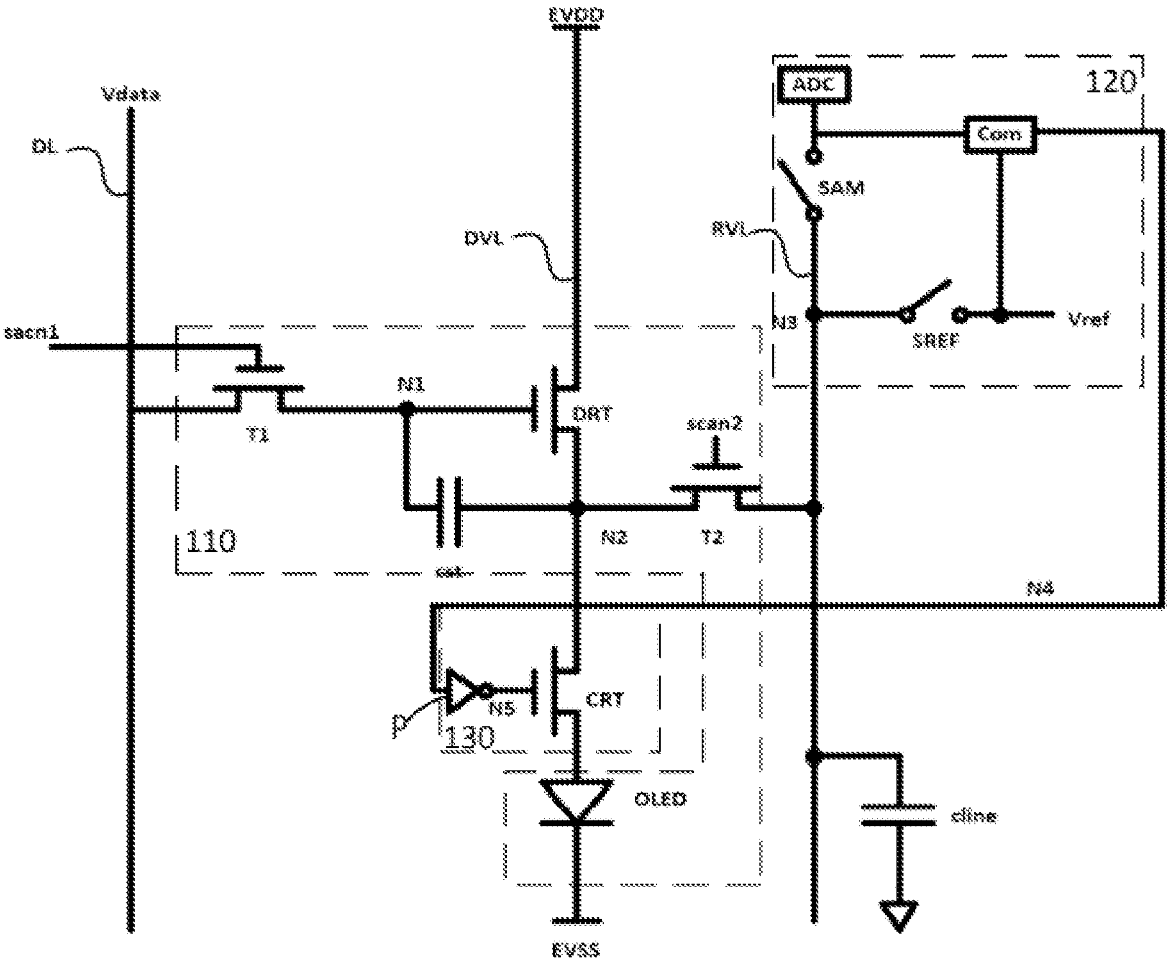
FIG. 4 is a schematic connection diagram of a pixel driving circuit according to another embodiment of the present disclosure.

That is, as shown in FIG. 3, the short circuit processing module 130 is connected in series between the another of the source and the drain of the driving transistor DRT and the power signal terminal EVDD. Alternatively, as shown in FIG. 4, the short circuit processing module 130 is connected in series between one of the source and the drain of the driving transistor DRT and the light emitting diode OLED. Alternatively, the short circuit processing module 130 is connected in series between the light emitting diode OLED and the ground terminal EVSS.

The present embodiment further improves a display effect by connecting the short circuit processing module 130 in series in a circuit in which the light emitting diode OLED and the driving transistor DRT are connected, and controlling the light emitting diode OLED to be turned on or off by turning on or off the short circuit processing module 130 to avoid that a panel is damaged due to an excessive current caused by the short circuit.

In an embodiment, as shown in FIGS. 2 to 4, the voltage detection module 120 includes a controller (not shown in the figures), a reference switch SREF, and a sampling switch SAM. One terminal of the reference switch SREF is electrically connected to a third node N3, another terminal of the reference switch SREF is electrically connected to the controller and the reference voltage terminal Vref, and the another of the source and the drain of the second switching transistor T2 is electrically connected to the third node N3. The reference voltage of the reference voltage terminal Vref is inputted to the third node N3 by closing the reference switch SREF, and the controller obtains the reference voltage for subsequent comparison. One terminal of the sampling switch SAM is electrically connected to the third node N3, and another terminal of the sampling switch SAM is electrically connected to the controller. The controller collects a detection voltage of the third node N3 by closing the sampling switch SAM, and compares the detection voltage with the reference voltage, to generate a control signal. The controller is electrically connected to the short circuit processing module 130 and sends the control signal to the short circuit processing module 130 so that the short circuit processing module 130 controls the light emitting diode OLED of the signal driving module 110 to be turned off or on.

Additionally, the third node N3 is further grounded by a linear capacitor Cline. The third node N3 may be connected to other electrical element. The connected electrical element does not affect short circuit detection and processing of the light emitting diode OLED in the present solution. However, impact of the other electrical element connected to the third node N3 on the circuit may be equivalent to the linear capacitor Cline.

In an embodiment, the controller includes an analog-to-digital converter ADC and a comparator Com. The analog-to-digital converter ADC is electrically connected to the sampling switch SAM. When the sampling switch SAM is closed, the analog-to-digital converter ADC collects the detection voltage of the third node N3. The analog-to-digital converter ADC is configured to collect an analog signal and convert the analog signal into a digital signal. The comparator Com is electrically connected to the reference voltage terminal Vref, the analog-to-digital converter ADC, and the short circuit processing module 130. The comparator Com obtains a preset reference voltage from the reference voltage terminal Vref, and obtains the collected detection voltage from the analog-to-digital converter ADC. Then, the comparator Com compares the detection voltage with the reference voltage, and sends a control signal obtained by the comparison to the short circuit processing module 130. The short circuit processing module 130 controls the light emitting diode OLED of the signal driving module 110 to be turned off or on.

In an embodiment, the light emitting diode OLED is turned off or on by the short circuit processing module 130. Therefore, the short circuit processing module 130 is disposed between the power signal terminal EVDD and the ground terminal EVSS, and is connected to the light emitting diode OLED and the driving transistor DRT. The short circuit processing module 130 includes a third switching transistor CRT, where a gate of the third switching transistor CRT is electrically connected to the controller, one of a source and a drain of the third switching transistor CRT is close to the ground terminal EVSS, and another of the source and the drain of the third switching transistor CRT is close to the power signal terminal EVDD. The gate of the third switching transistor CRT receives the control signal of the controller, and is turned off or on based on the control signal, so as to turn off or on the light emitting diode OLED. Further, the gate of the third switching transistor CRT is electrically connected to the comparator Com, and receives the control signal of the comparator Com.

In addition, the short circuit processing module 130 may further include a plurality of third switching transistors CRTs. When the plurality of third switching transistors CRTs are connected in parallel to each other, a connection manner of each of the third switching transistors CRTs is the same. The gate of each of the plurality of third switching transistors CRTs is electrically connected to the controller. One of the source and the drain of each of the plurality of third switching transistors CRTs is close to the ground terminal EVSS, and another of the source and the drain of each of the plurality of third switching transistors CRTs is close to the power signal terminal EVDD. When the plurality of third switching transistors CRTs are connected in series to each other, the gate of each of the plurality of third switching transistors CRTs is electrically connected to the controller. For the third switching transistor CRTs whose terminals are idle after the plurality of third switching transistors CRTs are connected in series, one of the source and the drain of one of the third switching transistors CRTs is close to the ground terminal EVSS, and another of the source and the drain of the another of the third switching transistors CRTs is close to the power signal terminal EVDD.

In the embodiment, the third switching transistor CRT is connected in series between the power signal terminal EVDD and the ground terminal EVSS as the short-circuit processing module 130, and controls the light emitting diode OLED to be turned off or on by turning off or on the third switching transistor CRT. After the light emitting diode OLED is short-circuited, the light emitting diode OLED is cut off in a timely manner, so as to avoid that a panel is damaged due to an excessive current caused by the short circuit, thereby further improving a display effect.

In an embodiment, since it only needs to be ensured that a status (off or on) of the light emitting diode OLED corresponds to the status of the third switching transistor CRT, the third switching transistor CRT is disposed between the power signal terminal EVDD and the ground terminal EVSS, and are connected to the light emitting diode OLED and the driving transistor DRT. A specific location of the third switching transistor CRT is not specifically limited.

Therefore, in an embodiment, as shown in FIG. 2 and FIG. 3, one of the source and the drain of the third switching transistor CRT is electrically connected to the another of the source and the drain of the driving transistor DRT, and the another of the source and the drain of the third switching transistor CRT is electrically connected to the power signal terminal EVDD. In another embodiment, as shown in FIG. 4, one of the source and the drain of the third switching transistor CRT is electrically connected to the light emitting diode OLED, and the another of the source and the drain of the third switching transistor CRT is electrically connected to one of the source and the drain of the driving transistor DRT. In another embodiment, one of the source and the drain of the third switching transistor CRT is electrically connected to the ground terminal EVSS, and another of the source and the drain of the third switching transistor CRT is electrically connected to the light emitting diode OLED.

Figure 5:
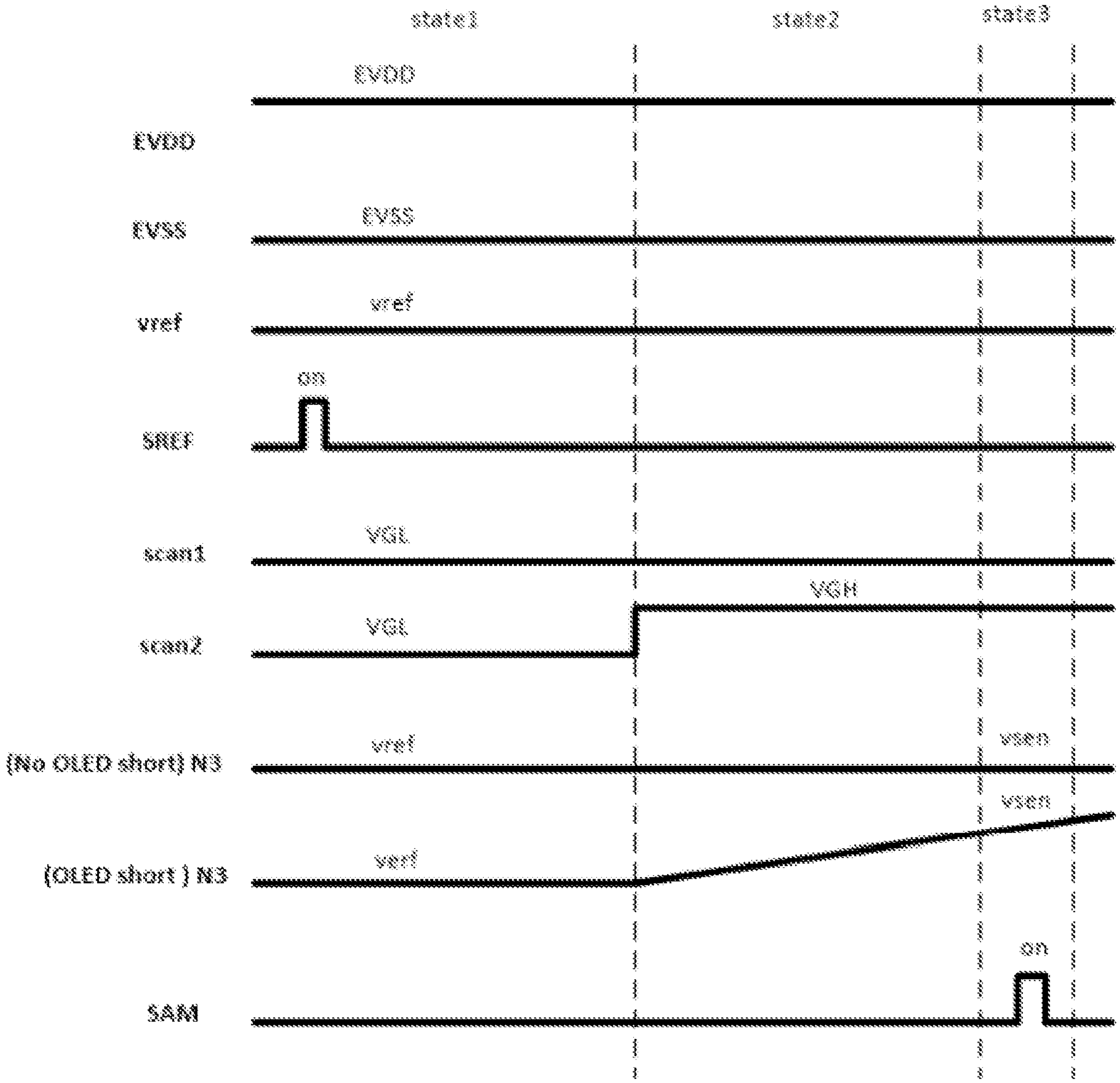
FIG. 5 is a schematic driving timing diagram of a pixel driving circuit according to another embodiment of the present disclosure.
Figure 6:
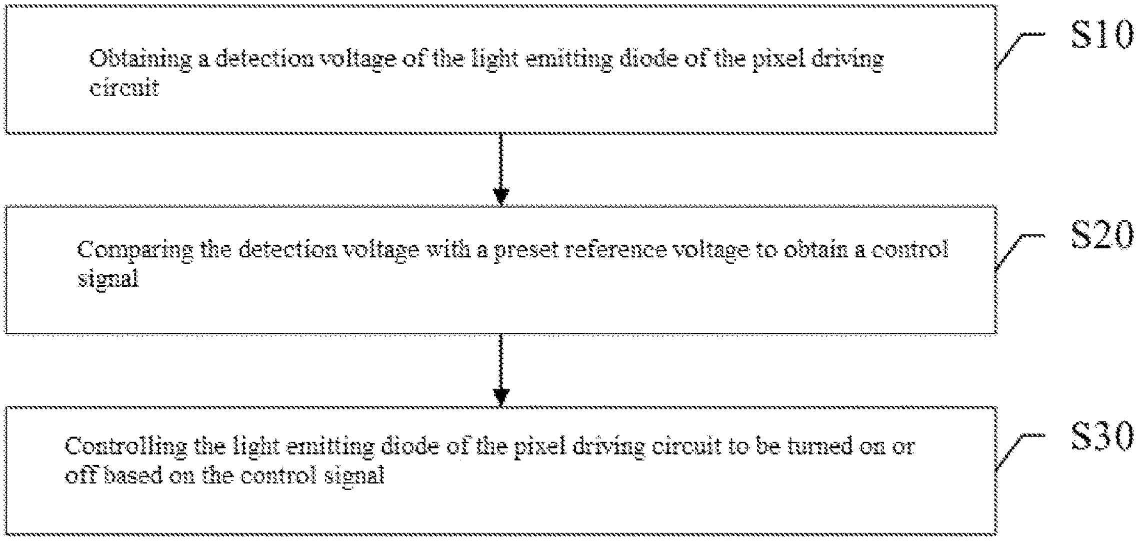
FIG. 6 is a schematic flowchart of a control method of a pixel driving circuit according to an embodiment of the present disclosure.
Figure 7:
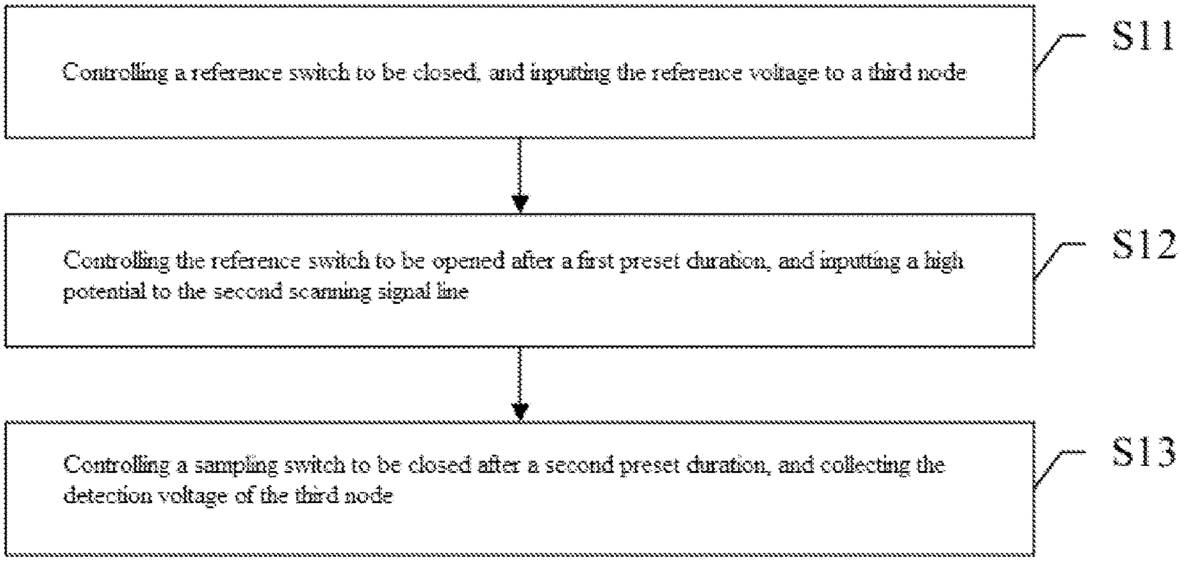
FIG. 7 is a schematic flowchart of a control method of a pixel driving circuit according to another embodiment of the present disclosure.

In an embodiment, driving timing needs to be combined with voltage inversion to implement automatic short circuit detection and processing of the light emitting diode OLED in the present solution. The driving timing is shown in FIG. 5, and is applied to a pixel driving circuit as shown in FIGS. 2 to 4. The driving timing of the pixel driving circuit includes an initialization phase state1, in which a reference switch SREF is closed, and the reference voltage is inputted to the third node N3. A detection phase state2 is entered after the initialization phase state1 is maintained for a first preset duration. In the detection phase state2, the reference switch SREF is turned off, the second scanning signal line scan2 is at a high potential, so that the second switching transistor T2 is turned on, and the third node N3 is connected to the second node N2. After the detection phase state2 is maintained for a second preset duration, the sampling phase state3 is entered. In the sampling phase state3, the sampling switch SAM is closed, and the controller collects the detection voltage of the third node N3. Since the second switching transistor T2 is turned on at this moment, the third node N3 is connected to the second node N2. Therefore, the detection voltage of the third node N3 is consistent with the voltage of the second node N2, that is, the voltage of the anode of the light emitting diode OLED. The detection voltage is compared with the reference voltage. If no short circuit occurs in the light emitting diode OLED and the detection voltage is a voltage corresponding to (No OLED short) N3 in FIG. 5, then the detection voltage remains unchanged, that is, the detection voltage is equal to the reference voltage. If a short circuit occurs in the light emitting diode OLED and the detection voltage is a voltage corresponding to (OLED short) N3 in FIG. 5, then the detection voltage is gradually increased on the basis of the reference voltage, that is, the detection voltage is greater than the reference voltage. It should be noted that, when the reference switch SREF and the sampling switch SREF are closed, the entire phase does not need to be kept until a next phase is entered, as long as each phase needs to be maintained for a preset duration. For example, in the initialization phase state1, the reference switch SREF is closed, and the reference switch SREF is opened after the reference switch SREF remains to be closed for the preset duration, and then the detection phase state2 is entered. The sampling switch SAM is similar, and is opened after the sampling switch SAM remains to be closed for a preset duration in the sampling phase state3. A duration of closing the reference switch SREF and a duration of closing the sampling switch SREF are determined according to time of signal sampling time and time of inputting sampling a signal. This is not specifically limited in the embodiment.

To ensure stability of signal sampling, each phase of the driving timing of the pixel driving circuit maintains a specific duration, and the preset duration maintained in each phase may be the same or different, and may be freely set according to a circuit status. This is not specifically limited in the embodiment.

The controller generates a control signal based on a comparison between the detection voltage and the reference voltage. For example, when no short circuit occurs in the light emitting diode OLED and the detection voltage is equal to the reference voltage, the controller generates a high-potential control signal to control the third switching transistor CRT to be turned on, and the light emitting diode OLED works normally. When a short circuit occurs in the light emitting diode OLED and the detection voltage is greater than the reference voltage, the controller generates a low-potential control signal to control the third switching transistor CRT to be turned off, and the light emitting diode OLED is correspondingly turned off.

Additionally, if a logic of generating the control signal by the controller is opposite to the foregoing solution, for example, when no short circuit occurs in the light emitting diode OLED and the detection voltage is equal to the reference voltage, the controller generates a low-potential control signal. When a short circuit occurs in the light emitting diode OLED and the detection voltage is greater than the reference voltage, the controller generates a high-potential control signal. As shown in FIG. 3 and FIG. 4, an NOT gate P may be connected in series between the controller and the another of the source and the drain of the third switching transistor CRT for conversion. A specific setting manner of the NOT gate P is not specifically limited in the embodiment, as long as it is ensured that when no short circuit occurs in the light emitting diode OLED and the detection voltage is equal to the reference voltage, the third switching transistor CRT is controlled to be turned on, and when a short circuit occurs in the light emitting diode OLED and the detection voltage is greater than the reference voltage, the third switching transistor CRT is controlled to be turned off.

It should be noted that, if the detection voltage is less than the reference voltage, a cause of this case may be that in an actual circuit, the second node N2 is connected with a relatively high voltage, that is, the second node N2 is short circuited to a high potential. This should not normally occur in the pixel circuit. If this occurs, then a problem occurs in a process of manufacturing the actual circuit. This is not specifically limited in the embodiment.

The simplest pixel circuit structure 3T1C is taken as an example in the foregoing. For a circuit structure such as an 4T1C/5T1C/6T1C, a solution of self-detecting and processing a short circuit in the OLED can also be implemented by using the same driving timing as that of the 3T1C for a plurality of TFTs added at similar positions as the TFT in the 3T1C architecture.

In the embodiment, a solution of self-detecting and processing a short circuit of OLED is implemented based on an Inverted-LED (e.g., OLED) technology in combination with the 3T1C drive circuit, the driving timing and the voltage comparator Com, so as to avoid that a panel is damaged due to an excessive current caused by a short circuit, thereby further improving a display effect.

Referring to FIGS. 1 to 7, an embodiment of the present disclosure provides a control method of a pixel driving circuit, applied to the pixel driving circuit in the foregoing embodiments, including:

S10 of obtaining a detection voltage of the light emitting diode OLED of the pixel driving circuit;

S20 of comparing the detection voltage with a preset reference voltage to obtain a control signal; and S30 of controlling the light emitting diode OLED of the pixel driving circuit to be turned off or on based on the control signal.

In an embodiment, the S10 of obtaining a detection voltage of the light emitting diode of the pixel driving circuit includes:

S11 of controlling a reference switch SREF to be closed, and inputting the reference voltage to a third node N3;

S12 of controlling the reference switch SREF to be opened after a first preset duration, and inputting a high potential to the second scanning signal line scan2; and S13 of controlling a sampling switch SAM to be closed after a second preset duration, and collecting the detection voltage of the third node N3.

In an embodiment, the S30 of controlling the light emitting diode OLED of the pixel driving circuit to be turned off or on based on the control signal includes:

S31: when the control signal shows that the detection voltage is the same as the preset reference voltage, determining that the light emitting diode works normally, and controlling the light emitting diode to be turned on; and S32: when the control signal shows that the detection voltage is greater than the preset reference voltage, determining that a short circuit occurs in the light emitting diode, and controlling the light emitting diode to be turned off.

In the foregoing embodiments, descriptions of the embodiments are emphasized. A portion that is not described in detail in an embodiment may refer to related descriptions in another embodiment.

Any combination of the technical features in the foregoing embodiments may be performed. For brevity of description, all possible combinations of the technical features in the foregoing embodiments are not described. However, as long as there is no contradiction among the combination of the technical features, it should be considered as the scope described in this specification.

The pixel driving circuit and the control method thereof provided in the embodiments of the present disclosure are described in detail above. A specific example is used herein to describe a principle and an implementation of the present disclosure. The description of the foregoing embodiments is merely used to help understand a method and a core idea of the present disclosure. In addition, a person skilled in the art may make changes in a specific implementation manner and an application scope according to an idea of the present disclosure. In conclusion, content of this specification should not be construed as a limitation on the present disclosure.

What is claimed is:

1. A pixel driving circuit, comprising:

a signal driving module connected to scanning signal lines and data signal lines for driving a light emitting diode of the signal driving module to emit light based on the scanning signal lines and the data signal lines;

a voltage detection module electrically connected to the signal driving module for collecting a detection voltage of the light emitting diode of the signal driving module and comparing the detection voltage with a reference voltage to generate a control signal; and a short circuit processing module electrically connected to the signal driving module and the voltage detection module for controlling the light emitting diode of the signal driving module to be turned off or on based on the control signal;

wherein, the scanning signal lines include a first scanning signal line and a second scanning signal line, and the signal driving module includes:

a first switching transistor, wherein a gate of the first switching transistor is electrically connected to the first scanning signal line, one of a source and a drain of the first switching transistor is electrically connected to the data signal line, and another of the source and the drain of the first switching transistor is electrically connected to a first node;

a driving transistor, wherein a gate of the driving transistor is electrically connected to the first node, one of a source and a drain of the driving transistor is electrically connected to a second node, and another of the source and the drain of the driving transistor is electrically connected to a power signal terminal;

a storage capacitor, wherein one terminal of the storage capacitor is electrically connected to the first node, and another terminal of the storage capacitor is electrically connected to the second node;

a light emitting diode, wherein an anode of the light emitting diode is electrically connected to the second node, and a cathode of the light emitting diode is electrically connected to a ground terminal; and a second switching transistor, wherein a gate of the second switching transistor is electrically connected to the second scanning signal line, one of a source and a drain of the second switching transistor is electrically connected to the second node, and another of the source and the drain of the second switching transistor is electrically connected to the voltage detection module;

wherein the short circuit processing module is connected in series between the power signal terminal and the driving transistor;

wherein, the voltage detection module includes:

a controller electrically connected to the short circuit processing module for detecting the detection voltage of the light emitting diode of the signal driving module and comparing the detection voltage with the reference voltage to generate the control signal;

a reference switch, wherein one terminal of the reference switch is electrically connected to a third node, another terminal of the reference switch is electrically connected to the controller and a reference voltage terminal, and another of the source and the drain of the second switching transistor is electrically connected to the third node; and a sampling switch, wherein one terminal of the sampling switch is electrically connected to the third node, and another terminal of the sampling switch is electrically connected to the controller.

2. The pixel driving circuit of claim 1, wherein the controller includes:

an analog-to-digital converter electrically connected to the sampling switch for collecting a detection voltage of the third node when the sampling switch is closed; and a comparator electrically connected to the reference voltage terminal, the analog-to-digital converter, and the short circuit processing module for comparing the detection voltage with the reference voltage to generate the control signal.

3. The pixel driving circuit of claim 1, wherein the short circuit processing module includes a third switching transistor, wherein a gate of the third switching transistor is electrically connected to the controller, one of a source and a drain of the third switching transistor is close to the ground terminal, another of the source and the drain of the third switching transistor is close to the power signal terminal, and the third switching transistor is configured to be turned off or on based on the control signal.

4. The pixel driving circuit of claim 3, wherein the one of the source and the drain of the third switching transistor is electrically connected to the another of the source and the drain of the driving transistor, and the another of the source and the drain of the third switching transistor is electrically connected to the power signal terminal.

5. The pixel driving circuit of claim 3, wherein driving timing of the pixel driving circuit includes:

an initialization phase state1, in which the reference switch is closed and the reference voltage is input to the third node;

a detection phase state2, in which the reference switch is opened, and the second scanning signal line is at a high potential so that the second switching transistor is turned on and the third node is connected to the second node; and a sampling phase state3, in which the sampling switch is closed and the controller collects the detection voltage of the third node and compares the detection voltage with the reference voltage to generate the control signal.

6. The pixel driving circuit of claim 1, wherein the short circuit processing module controls the light emitting diode to be turned on when the control signal shows that the detection voltage is the same as a preset reference voltage; and the short circuit processing module controls the light emitting diode to be turned off when the control signal shows that the detection voltage is greater than a preset reference voltage.

7. A pixel driving circuit, comprising:

a signal driving module connected to scanning signal lines and data signal lines for driving a light emitting diode of the signal driving module to emit light, based on the scanning signal lines and the data signal lines;

a voltage detection module electrically connected to the signal driving module for collecting a detection voltage of the light emitting diode of the signal driving module and comparing the detection voltage with a reference voltage to generate a control signal; and a short circuit processing module electrically connected to the signal driving module and the voltage detection module for controlling the light emitting diode of the signal driving module to be turned off or on, based on the control signal, wherein the signal driving module includes at least three transistors, wherein the scanning signal lines includes a first scanning signal line and a second scanning signal line, and the signal driving module includes:

a first switching transistor, wherein a gate of the first switching transistor is electrically connected to the first scanning signal line, one of a source and a drain of the first switching transistor is electrically connected to the data signal line, and another of the source and the drain of the first switching transistor is electrically connected to a first node;

a driving transistor, wherein a gate of the driving transistor is electrically connected to the first node, one of a source and a drain of the driving transistor is electrically connected to a second node, and another of the source and the drain of the driving transistor is electrically connected to a power signal terminal;

a storage capacitor, wherein one terminal of the storage capacitor is electrically connected to the first node, and another terminal of the storage capacitor is electrically connected to the second node;

a light emitting diode, wherein an anode of the light emitting diode is electrically connected to the second node, and a cathode of the light emitting diode is electrically connected to a ground terminal; and a second switching transistor, wherein a gate of the second switching transistor is electrically connected to the second scanning signal line, one of a source and a drain of the second switching transistor is electrically connected to the second node, and another of the source and the drain of the second switching transistor is electrically connected to the voltage detection module, wherein the short circuit processing module is connected in series between the power signal terminal and the driving transistor.

8. The pixel driving circuit of claim 7, wherein the voltage detection module includes:

a controller electrically connected to the short circuit processing module for detecting the detection voltage of the light emitting diode of the signal driving module and comparing the detection voltage with the reference voltage to generate the control signal;

a reference switch, wherein one terminal of the reference switch is electrically connected to a third node, another terminal of the reference switch is electrically connected to the controller and a reference voltage terminal, and another of the source and the drain of the second switching transistor is electrically connected to the third node; and a sampling switch, wherein one terminal of the sampling switch is electrically connected to the third node, and another terminal of the sampling switch is electrically connected to the controller.

9. The pixel driving circuit of claim 8, wherein the controller includes:

an analog-to-digital converter electrically connected to the sampling switch for collecting a detection voltage of the third node when the sampling switch is closed; and a comparator electrically connected to the reference voltage terminal, the analog-to-digital converter, and the short circuit processing module for comparing the detection voltage with the reference voltage to generate the control signal.

10. The pixel driving circuit of claim 8, wherein the voltage detection module further includes a linear capacitor through which the third node is grounded.

11. The pixel driving circuit of claim 8, wherein the short circuit processing module includes a third switching transistor, wherein a gate of the third switching transistor is electrically connected to the controller, one of a source and a drain of the third switching transistor is close to the ground terminal, another of the source and the drain of the third switching transistor is close to the power signal terminal, and the third switching transistor is configured to be turned off or on based on the control signal.

12. The pixel driving circuit of claim 11, wherein the short circuit processing module includes at least two third switching transistors connected in parallel or in series, wherein a gate of the at least two third switching transistors is electrically connected to the controller, one of a source and a drain of the at least two third switching transistors is close to the ground terminal, and another of the source and the drain of the at least two third switching transistors is close to the power signal terminal.

13. The pixel driving circuit of claim 11, wherein the one of the source and the drain of the third switching transistor is electrically connected to the another of the source and the drain of the driving transistor, and the another of the source and the drain of the third switching transistor is electrically connected to the power signal terminal.

14. The pixel driving circuit of claim 11, wherein driving timing of the pixel driving circuit includes:

an initialization phase state1, in which the reference switch is closed and the reference voltage is input to the third node; and a detection phase state2, in which the reference switch is opened, and the second scanning signal line is at a high potential so that the second switching transistor is turned on and the third node is connected to the second node; and a sampling phase state3, in which the sampling switch is closed and the controller collects the detection voltage of the third node and compares the detection voltage with the reference voltage to generate the control signal.

15. The pixel driving circuit of claim 14, wherein each of the initialization stage state1, the detection stage state2, and the sampling stage state3 holds a preset duration corresponding to the stage.

16. The pixel driving circuit of claim 11, wherein the short circuit processing module includes a NOT gate disposed between the controller and the gate of the third switching transistor.

17. A driving method of a pixel driving circuit applied to the pixel driving circuit comprising:

a signal driving module connected to scanning signal lines and data signal lines for driving a light emitting diode of the signal driving module to emit light, based on the scanning signal lines and the data signal lines;

a voltage detection module electrically connected to the signal driving module for collecting a detection voltage of the light emitting diode of the signal driving module and comparing the detection voltage with a reference voltage to generate a control signal; and a short circuit processing module electrically connected to the signal driving module and the voltage detection module for controlling the light emitting diode of the signal driving module to be turned off or on, based on the control signal, the driving method comprises:

obtaining the detection voltage of the light emitting diode of the pixel driving circuit;

comparing the detection voltage with the preset reference voltage to obtain the control signal; and controlling the light emitting diode of the pixel driving circuit to be turned on or off based on the control signal, wherein the signal driving module includes at least three transistors, wherein the scanning signal lines includes a first scanning signal line and a second scanning signal line, and the signal driving module includes:

a first switching transistor, wherein a gate of the first switching transistor is electrically connected to the first scanning signal line, one of a source and a drain of the first switching transistor is electrically connected to the data signal line, and another of the source and the drain of the first switching transistor is electrically connected to a first node;

a driving transistor, wherein a gate of the driving transistor is electrically connected to the first node, one of a source and a drain of the driving transistor is electrically connected to a second node, and another of the source and the drain of the driving transistor is electrically connected to a power signal terminal;

a storage capacitor, wherein one terminal of the storage capacitor is electrically connected to the first node, and another terminal of the storage capacitor is electrically connected to the second node;

a light emitting diode, wherein an anode of the light emitting diode is electrically connected to the second node, and a cathode of the light emitting diode is electrically connected to a ground terminal; and a second switching transistor, wherein a gate of the second switching transistor is electrically connected to the second scanning signal line, one of a source and a drain of the second switching transistor is electrically connected to the second node, and another of the source and the drain of the second switching transistor is electrically connected to the voltage detection module, wherein the short circuit processing module is connected in series between the power signal terminal and the driving transistor.

18. The driving method of claim 17, wherein the controlling the light emitting diode of the pixel driving circuit to be turned on or off based on the control signal includes:

when the control signal shows that the detection voltage is the same as the preset reference voltage, determining that the light emitting diode works normally, and controlling the light emitting diode to be turned on; and when the control signal shows that the detection voltage is greater than the preset reference voltage, determining that the light emitting diode is short circuited, and controlling the light emitting diode to be turned off.

* * * * *